(12) United States Patent
Alexander et al.

(10) Patent No.: US 8,327,809 B2
(45) Date of Patent: Dec. 11, 2012

(54) TRI-SECTOR REGENERATIVE OXIDANT PREHEATER FOR OXY-FIRED PULVERIZED COAL COMBUSTION

(75) Inventors: Kiplin C. Alexander, Wadsworth, OH (US); David L. Kraft, Massillon, OH (US); Dennis K. McDonald, Massillon, OH (US)

(73) Assignee: Babcock & Wilcox Power Generation Group, Inc., Barbedon, OH (US)

( * ) Notice: Subject to any disclaimer, the term of this patent is extended or adjusted under 35 U.S.C. 154(b) by 1149 days.

(21) Appl. No.: 12/169,168

(22) Filed: Jul. 8, 2008

(65) Prior Publication Data
US 2009/0013941 A1    Jan. 15, 2009

Related U.S. Application Data

(60) Provisional application No. 60/948,784, filed on Jul. 10, 2007.

(51) Int. Cl.
*F23L 15/02* (2006.01)

(52) U.S. Cl. .......... 122/1 A; 122/DIG. 1; 165/9

(58) Field of Classification Search ............ 122/1 A, 122/DIG. 1–2; 110/254; 165/8, 9, 10; 277/306; 431/161; 454/187–188
See application file for complete search history.

(56) References Cited

U.S. PATENT DOCUMENTS

| | | | | |
|---|---|---|---|---|
| 5,915,340 A | * | 6/1999 | Cronin et al. | 122/1 A |
| 6,581,676 B2 | * | 6/2003 | Fierle et al. | 165/9 |
| 6,640,752 B1 | * | 11/2003 | Counterman | 122/1 A |
| 6,647,929 B1 | * | 11/2003 | Counterman | 122/1 A |
| 6,974,318 B2 | * | 12/2005 | Ahn et al. | 432/180 |
| 7,082,987 B2 | * | 8/2006 | Hamilton | 165/9 |
| 7,278,378 B2 | * | 10/2007 | Counterman | 122/1 A |
| 2006/0090468 A1 | * | 5/2006 | Counterman | 60/659 |

* cited by examiner

*Primary Examiner* — Steven B McAllister
*Assistant Examiner* — John Bargero
(74) *Attorney, Agent, or Firm* — Eric Marich

(57) ABSTRACT

A tri-sector regenerative oxidant preheater apparatus, method and arrangement for utilization with oxy-fired pulverized coal combustion power plants. The preheater includes a stationary housing and a rotor rotatably mounted in the housing. Sector plates are located at the axial ends of the rotor and divide the preheater into a flue gas sector, two primary oxidant sectors, and a secondary oxidant sector interposed between the two primary oxidant sectors. A primary oxidant fan is located downstream of the preheater to create a negative environment in the primary oxidant sectors. During operation of the preheater, the environments of the two primary oxidant sectors and the flue gas sector are at about the same negative pressure, and thus there is very limited leakage between the oxidant side and the flue gas side of the preheater. The environment of the secondary oxidant sector is at a positive pressure and leakage to the negative environment of the primary oxidant sectors will be that of secondary oxidant to primary oxidant with no loss secondary oxidant to the gas side of the preheater.

10 Claims, 4 Drawing Sheets

TRI-SECTOR REGENERATIVE OXIDANT PREHEATER FOR OXY-FIRED PULVERIZED COAL COMBUSTION

This application claims the benefit of U.S. Provisional patent application Ser. No. 60/948,784 filed Jul. 10, 2007 which is incorporated herein by reference.

FIELD AND BACKGROUND OF THE INVENTION

The present invention relates, in general, to oxy-fired pulverized coal combustion and, in particular, to minimizing the loss of oxygen through leakage of oxidant into the gas side of a rotary regenerative oxidant preheater.

Air quality laws, both at the federal and state level have set increasingly stringent emission standards. Often of particular concern are sulfur dioxide and other acidic gases produced by the combustion of fossil fuels and various industrial operations. Acidic gases are known to be hazardous to the environment, such that their emission into the atmosphere is closely regulated by clean air statutes.

New technologies are addressing this problem so that fossil fuels and particularly coal can be utilized for future generations without polluting the atmosphere and contributing to global warming. One of the technologies being developed has potential for retrofit to existing pulverized coal plants, which are the backbone of power generation in many countries. This technology is oxy-fuel combustion which is the process of firing a fossil-fueled boiler with an oxygen-enriched gas mix instead of air. Almost all the nitrogen is removed from the input air, yielding a stream that is approximately 95% oxygen. Firing with pure oxygen would result in too high a flame temperature, so the mixture is diluted by mixing with recycled flue gas. Oxy-fuel combustion produces approximately 75% less flue gas than air fueled combustion.

About 70% to 80% of the flue gas exiting the wet scrubber of an oxy-fired pulverized coal combustion plant is returned to the boiler where oxygen is introduced to produce the combustion oxidant gas, while the remainder of the flue gas is sent to a purification and compression system where it is prepared to suit pipeline and storage requirements. Thus, it is imperative that the carbon dioxide concentration be as high as possible with a low concentration of sulfur, nitrogen, oxygen, and water as can be practically and economically achieved.

Oxy-fired pulverized coal combustion burns pulverized coal in an oxidant comprised of a mixture of relatively pure oxygen and recycled flue gas to reduce the net volume of flue gases generated from the combustion process in a boiler, and to substantially increase the concentration of carbon dioxide in the flue gases. The recycled flue gas represents a portion of the flue gases generated by the combustion process and acts to dilute the flame temperature and maintain the volume necessary to ensure adequate convective heat transfer to all boiler areas, and can also be used to dry and carry the pulverized coal to the combustion space of the boiler.

The oxidant used in oxy-fired pulverized coal combustion is preferably heated in rotary regenerative type air preheaters, even though such air preheaters encounter leakage from the air side to the gas side. Tubular and plate type air preheaters do not experience leakage and provide a reasonable alternative to the rotary regenerative air preheater at industrial boiler scale. However, this is not a cost effective alternative at the electric utility boiler scale.

In conventional pulverized coal firing, a small portion of the air required for combustion is used to dry and carry the pulverized coal to the burners for burning the coal in the furnace or combustion space of the boiler. This portion of the air is known as primary air. In direct firing systems, primary air is also used to dry the coal in the pulverizer. The remainder of the combustion air is introduced in a windbox housing the burners, and is known as secondary air.

Rotary regenerative air preheaters are relatively compact and are the most widely used type for combustion air preheating in electric utility boiler plants. Rotary regenerative air preheaters transfer heat indirectly by convection as a heat storage medium is periodically exposed to heat-emitting flue gases and heat-absorbing combustion air. The rotary regenerative air preheater includes a cylindrical shell or housing that contains a coaxial rotor packed with metal heat storing corrugated plates which are bundled so as to present flow passageways therebetween. The preheater is divided into a gas side which is under negative pressure and an air side which is under positive pressure. The most prevalent flow arrangement has the flue gases entering the top of the rotor and the combustion air entering the bottom of the rotor in counter flow fashion. Consequently, the cold air inlet and the cooled gas outlet are at one end of the preheater, usually referred to as the cold end, the hot gas inlet and the heated air outlet are at the opposite end of the preheater, usually referred to as the hot end. As a result, an axial temperature gradient exists from the hot end of the rotor to the cold end of the rotor. In response to this temperature gradient, the rotor tends to distort and to assume a shape similar to that of an inverted dish, commonly referred to as rotor turndown.

In operation, the rotor is rotated slowly about a central shaft, making one to three revolutions per minute causing each bundle of heat absorbing plates to be placed, alternately, into the flow path of the heat-emitting flue gases and the flow path of the heat-absorbing combustion air. The most notable characteristic of rotary regenerative air preheaters is that a small but significant amount of air leaks from the positive pressure air side to the negative pressure gas side due to rotor turndown and the rotary operation of the air preheater. In order to prevent undue leakage from the air side to the gas side, the air preheater is provided with radial, axial and peripheral seals. It is known to construct these seals of thin, flexible metal. The seals are adjusted when the gaps are the largest. This means that, when the gaps are small due to expansion of the rotor and the housing, the seals may be severely bent and forced into high contact pressure with the rotor or housing. For this reason, seals wear relatively quickly and require replacement.

In a prior art or conventional regenerative air or oxidant preheater arrangement, the primary air or oxidant is at a positive pressure of about 40 inches of water gage (wg.), the secondary air or oxidant is at a positive pressure of about 20 inches wg, and the flue gas is at a negative pressure of about 5 inches wg. This conventional air or oxidant preheater has the air or oxidant side of the preheater divided into three sectors, a central sector which receives the primary air or oxidant and is flanked by a pair of sectors which receive the secondary air or oxidant and are located adjacent the flue gas side portion of the preheater. This arrangement minimizes the pressure difference across the seals between the air or oxidant side and the gas side to about 25 inches wg, which results in 7% to 14% leakage of air or oxidant into the flue gas. These values, though representative of a coal fired plant, may vary depending on fuel and equipment variations and are not intended as absolute.

In an oxy-fired pulverized coal plant the combustion process is carried out by the oxidant, which is comprised of a mixture of relatively pure oxygen and recycled flue gas, with a portion thereof being used to dry and transport the pulverized coal to the burners and the remainder being introduced into the boiler combustion space. The oxidant must be heated before entering the combustion process, and the equipment of choice is a rotary regenerative air preheater since it is cost effective for electric utility power plants. However, the leakage occurring in the regenerative oxidant preheater from the positive pressure oxidant to the negative pressure flue gas represents a loss of oxygen and recycled flue gas to the gas side of the regenerative oxidant preheater. This loss of oxygen along with the recycle gas requires additional oxygen production in an air separation unit to make up for the loss of oxygen, and it also requires the removal of the leaked oxygen from the product gas in a compression and purification unit before the concentrated carbon dioxide can be disposed of via storage or use for enhanced oil recovery, since pipeline line and use constraints require that the flue gas be as high in concentration of carbon dioxide and as low in concentration of nitrogen, sulfur, oxygen and water, as practical. Both of these remedial procedures result in increased plant operating costs. Thus, oxidant introduction into the flue gas must be minimized or eliminated. Furthermore, it is undesirable for an oxidant with a high concentration of oxygen to be exposed to ash potentially containing some combustible carbon and thereby raising the concern of fire.

SUMMARY OF THE INVENTION

The present invention provides an apparatus, method and arrangement of a tri-sector rotary regenerative oxidant preheater which includes a stationary housing and a rotor rotatably mounted in the housing. Sector plates are located at the axial ends of the rotor and divide the preheater into a flue gas sector, a secondary oxidant sector, and two primary oxidant sectors. The secondary oxidant sector is interposed between the two primary oxidant sectors.

During operation of the preheater, the environments in the flue gas sector and the primary oxidant sectors of the preheater are at a negative pressure of about 5 inches wg., and the secondary oxidant sector of the preheater is at a positive pressure of about 20 inches wg.

One of the two primary oxidant sectors borders the 3 o'clock side of the flue gas sector, while the other primary oxidant sector borders the 9 o'clock side of the flue gas sector. Since the operating environments of the flue gas sector and the two primary oxidant sectors are at about the same negative pressure, there is very limited leakage between the oxidant side and the gas side of the preheater.

The secondary oxidant sector is located between the two primary oxidant sectors. Since the operating environments of the primary oxidant sectors are a negative pressure of about 5 inches wg., and the operating environment of the secondary oxidant sector is a positive pressure of about 20 inches wg., there will be a pressure difference of about 25 inches between the primary oxidant sectors and the secondary oxidant sector, but any leakage will be that of the secondary oxidant to the primary oxidant and therefore there will be no loss of secondary oxidant to the gas side of the preheater.

In one embodiment of the invention, the preheater rotor rotates in a clockwise direction. In this embodiment, the primary oxidant sector which borders the 3 o'clock side of the flue gas sector is normally larger than the primary oxidant sector which borders the 9 o'clock side of the flue gas sector, and is sized to deliver the required primary oxidant temperature. The primary oxidant sector which borders the 9 o'clock side of the flue gas sector is normally smaller than the primary oxidant sector bordering the 3 o'clock side of the flue gas sector and is sized for the minimum required to substantially preclude the leakage of oxidant into the flue gas sector. The secondary oxidant sector which is interposed between the two primary oxidant sectors is sized to deliver the required secondary oxidant temperature.

In another embodiment of the invention, the preheater rotor rotates in a counterclockwise direction. In this embodiment, the primary oxidant sector which borders the 9 o'clock side of the flue gas sector is normally larger than the primary oxidant sector which borders the 3 o'clock side of the flue gas sector, and is sized to deliver the required primary oxidant temperature. The primary oxidant sector which borders the 3 o'clock side of the flue gas sector is normally smaller than the primary oxidant sector bordering the 9 o'clock side of the flue gas sector and is sized for the minimum required to substantially preclude the leakage of oxidant into the flue gas sector. The secondary oxidant sector which is interposed between the two primary oxidant sectors is sized to deliver the required secondary oxidant temperature.

In still another embodiment of the invention, the preheater rotor is rotatable in either a clockwise or counterclockwise direction. One of the two primary oxidant sectors borders the 3 o'clock side of the flue gas sector and the other primary oxidant sector borders the 9 o'clock side of the flue gas sector. Both primary oxidant sectors are sized, so as together, to deliver the required primary oxidant temperature. The secondary oxidant sector which is interposed between the two primary oxidant sectors are substantially of equal size, and are sized to deliver the required secondary oxidant temperature.

Another aspect of the present invention is drawn to an oxy-fired pulverized coal combustion power plant which includes a boiler. A boundary wall forms a combustion space within the boiler. A burner wall is formed in the boundary wall and spaced therefrom to form a windbox therebetween. A burner port is formed in the boundary wall, and a coal burner nozzle is provided which discharges through the port into the boiler combustion space. A coal pulverizer and a conduit which supplies coal to the pulverizer to be pulverized therein are provided. A tri-sector rotary regenerative oxidant preheater has sector plates which divide the preheater into a flue gas sector, two primary oxidant sectors, and a secondary sector interposed between the two primary oxidant sectors. A duct delivers hot flue gases from the boiler to the preheater. A forced draft fan is located upstream flow-wise of the preheater and supplies secondary oxidant to the preheater to be heated as it passes through the secondary sector of the preheater. A duct conveys the heated secondary oxidant to the winbox. A primary oxidant fan is located downstream of the preheater and draws the primary oxidant through the two primary oxidant sectors to be heated as it passes therethrough. A duct conveys the heated primary oxidant to the pulverizer. The heated primary oxidant sweeps and dries the pulverized coal and carries it through a conduit to the coal burner nozzle which mixes the pulverized coal and heated primary oxidant with the heated secondary oxidant to establish a stable flame in the boiler combustion space.

The oxy-fired pulverized coal combustion power plant includes a main oxygen mixer is operatively located upstream oxidant flow-wise of the forced draft fan.

In one embodiment, the oxy-fired pulverized coal combustion power plant includes a secondary oxygen mixer operatively located between the forced draft fan and the tri-sector rotary regenerative oxidant preheater.

In another embodiment, the oxy-fired pulverized coal combustion power plant includes a secondary oxygen mixer operatively located between the tri-sector rotary regenerative oxidant preheater and the boiler windbox.

These and other features and advantages of the present invention will be better understood and its advantages will be more readily appreciated from the detailed description of the preferred embodiment, especially when read with reference to the accompanying drawings.

DESCRIPTION OF THE PREFERRED EMBODIMENTS

Reference will hereinafter be made to the accompanying drawings wherein like numerals designate the same or functionally similar elements throughout the various figures. The present invention resides in reducing oxidant leakage from the oxidant side to the gas side of a rotary regenerative oxidant preheater.

Figure 1:
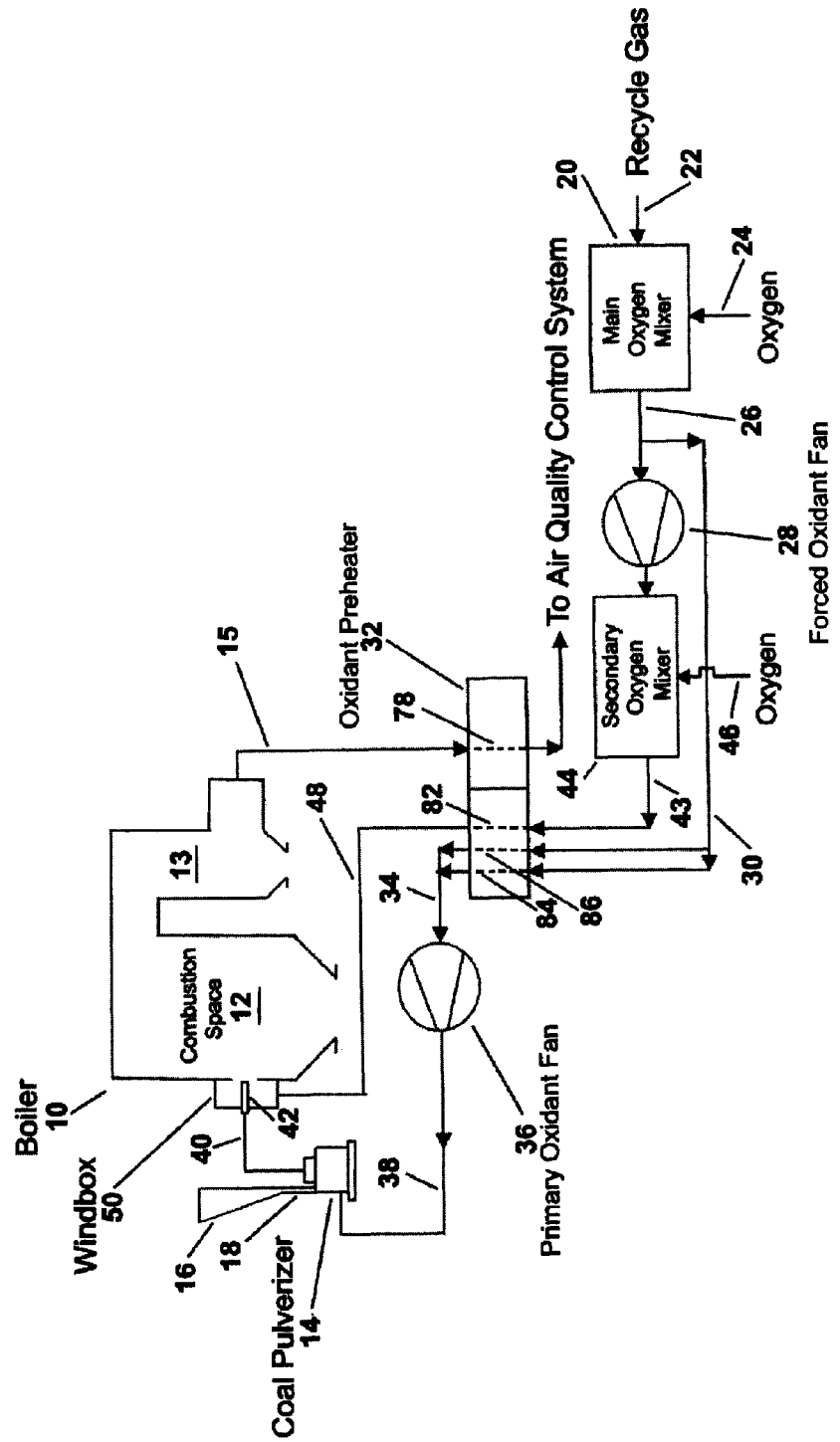
FIG. 1 is a flow diagram of an oxy-fired pulverized coal combustion system including a secondary oxygen mixer located upstream oxidant flow-wise of a tri-sector regenerative oxidant preheater.
Figure 2:
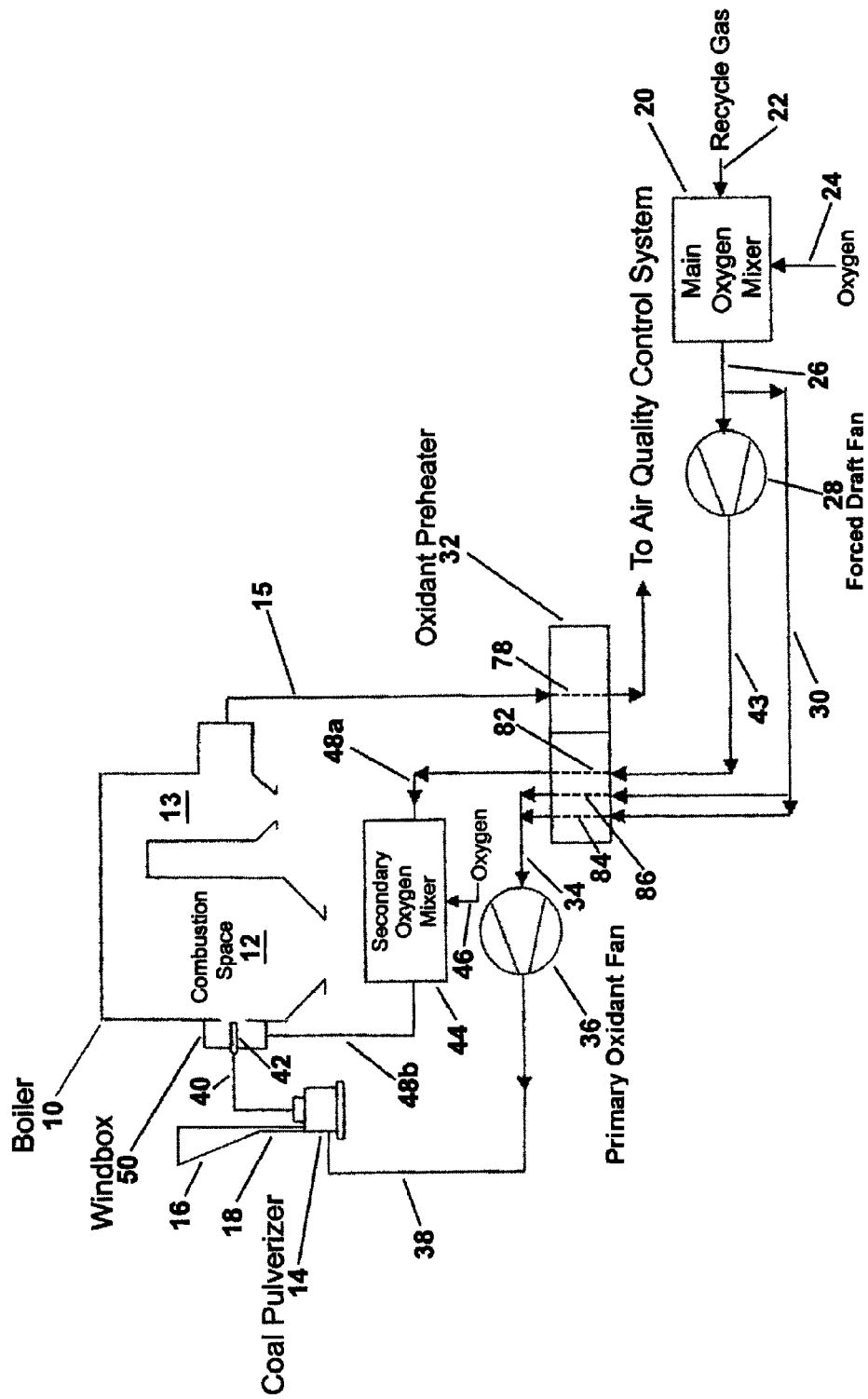
FIG. 2 is a flow diagram of an oxy-fired coal combustion system including a secondary oxygen mixer located downstream oxidant flow-wise of a tri-sector regenerative oxidant preheater.

Referring to FIGS. 1 and 2, there is shown, diagrammatically, a tri-sector regenerative oxidant preheater for heating the primary and secondary oxygen enriched flue gas, hereinafter referred to as an oxidant. The boiler is generally shown at 10 and includes a combustion space 12. Coal is supplied to a pulverizer 14 from a coal delivery system which includes a coal bunker 16 discharging coal into the pulverizer 14 through a conduit 18.

The oxidant delivery system includes a main oxygen mixer 20 which receives a recycled flue gas 22 resulting from the coal combustion process and an oxygen stream 24 which has a purity of about 95%. The oxygen enriched flue gas or oxidant stream is conveyed through ductwork 26. A greater portion of the oxidant stream represents the secondary oxidant and is delivered to the suction side of a forced draft fan 28, while the remainder of the oxidant stream represents the primary oxidant and is delivered to the ductwork 30.

The primary oxidant is conveyed through ductwork 30 to the tri-sector regenerative oxidant preheater 32, as also shown in FIGS. 3-6, it is heated as it passes through primary oxidant sectors 84 and 86 of preheater 32. The heated primary oxidant streams exiting sections sectors 84 and 86 of preheater 32 are conveyed to a common ductwork 34 and delivered to the suction side of a primary oxidant fan 36. The primary oxidant exiting the fan 36 is conveyed through ductwork 38 to the pulverizer 14 where it dries and sweeps the pulverized coal and carries it through a conduit 40 to burner 42 which mixes the pulverized coal and primary oxidant with the secondary oxidant to establish a stable flame in the combustion space 12.

The secondary oxidant exiting the forced draft fan 28 is conveyed to a secondary oxygen mixer 44, wherein the secondary oxidant is further enriched with an oxygen stream 46. The further enriched secondary oxidant is conveyed to the tri-sector regenerative oxidant preheater 32 where, as also shown in FIGS. 3-6, it is heated as it passes through sector 82 of preheater 32. The heated secondary oxidant exiting sector 82 of preheater 32 is conveyed through ductwork 48 to a windbox 50 which houses the coal burners, such as the one depicted at 42, and mixes the secondary oxidant with the pulverized coal and primary oxidant, introduced by the burner 42, in a manner that establishes a stable flame in the combustion space 12. The pulverized coal is burned in the combustion space 12, and the resulting hot flue gas flows through a convection pass 13 containing heat exchange surfaces, not shown. The hot flue gas leaving the convection pass 13 is conveyed through ductwork 15 to the flue gas sector 78 of preheater 32 where it gives up heat to the primary and secondary oxidants flowing through the oxidant sectors 82, 84, and 86 of preheater 32. The cooled flue gas leaving preheater 32 is conveyed to an air quality control system with about 70% to 80% of the flue gas being recycled back to the boiler 10 as oxidant.

Referring to FIG. 2, there is shown an alternative arrangement wherein the ductwork 48 split into sections 48a and 48b with the secondary oxygen mixer 44 being operatively located between the ductwork sections 48a and 48b, and downstream oxidant flow-wise of the tri-sector preheater 32. The oxidant exiting the sector 82 is conveyed through ductwork section 48a to the secondary oxygen mixer 44, wherein the secondary oxidant is further enriched with an oxygen stream 46. The further enriched oxidant exiting the mixer 44 is conveyed through ductwork section 48b to the windbox 50.

Figure 3:
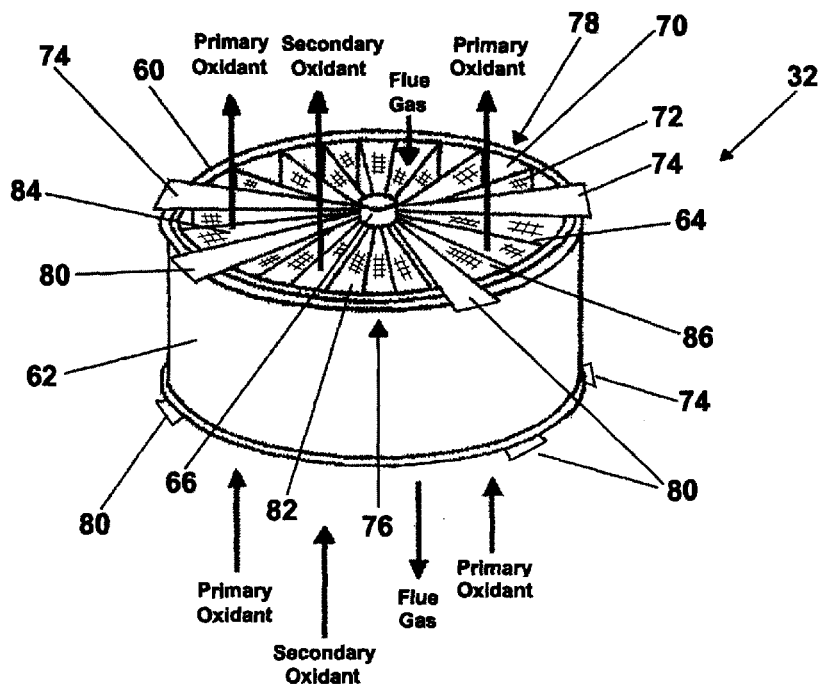
FIG. 3 is a diagrammatic perspective view of the rotor and the sectors of the regenerative oxidant preheater in accordance with the present invention.

Referring to FIG. 3, there is shown, diagrammatically, a tri-sector regenerative oxidant preheater in accordance with the invention and designated as 32. The oxidant preheater 32 has a rotor 60 coaxially and rotatably mounted in a shell or housing 62. The rotor 60 is divided by partitions 64 extending radially outward from a center post 66 to the rotor shell 62, and thus dividing the rotor 60 into pie shaped compartments 70 containing heat exchanger elements 72. The oxidant preheater 32 is divided by sector plates 74 into an oxidant sector 76 and a flue gas sector 78. The oxidant sector 76 is subdivided by sector plates 80 into a secondary oxidant sector 82 and two primary oxidant sectors 84 and 86. The secondary oxidant sector 82 is located between the primary oxidant sectors 84 and 86, and the primary oxidant sectors 84 and 86 are located adjacent to the flue gas sector 78 and the secondary oxidant sector 82. Thus, the secondary oxidant sector 82 is not adjacent the flue gas sector 78.

Figure 4:
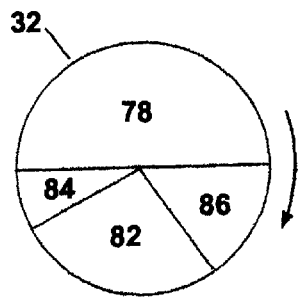
FIG. 4 is a simplified representation of one embodiment of the sectors of the regenerative oxidant preheater in accordance to the present invention.
Figure 5:
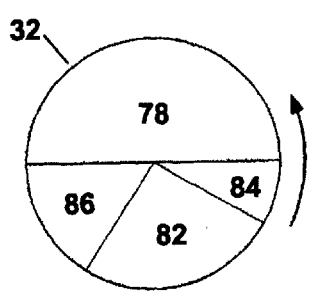
FIG. 5 is a simplified representation of another embodiment of the sectors of the regenerative oxidant preheater in accordance with the present invention.
Figure 6:
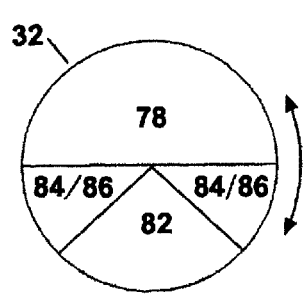
FIG. 6 is a simplified representation of still another embodiment of the sectors of the regenerative oxidant preheater in accordance with the present invention.

Referring to FIGS. 4-6, there are shown simplified representations of a tri-sector regenerative oxidant preheater 32. The primary oxidant flows through sectors 84 and 86, which border the flue gas sector 78. The secondary oxidant flows through sector 82 which is interposed between the sectors 84 and 86. In accordance with the present invention, the primary oxidant fan 36 is located downstream oxidant flow-wise of the preheater 32, as shown in FIGS. 1 and 2. The primary oxidant is drawn through sectors 84 and 86 of the preheater 32 by the primary oxidant fan 36, thus creating an environment in the primary oxidant sectors 84 and 86, wherein the primary oxidant flowing therethrough is at a negative pressure of about a 5 inches wg. The secondary oxidant is forced through sector 82 of the preheater 32 by the forced draft fan 28 which is located upstream gas flow-wise of the preheater 32, as shown in FIGS. 1 and 2, thus creating an environment in the secondary oxidant sector 82, wherein the secondary oxidant flowing therethrough is at a positive pressure of about 20 inches wg. The flue gas is drawn through sector 78 of the preheater 32 by an induced draft fan, not shown, thus creating an environment in the flue gas sector 78, wherein the flue gas is at a negative pressure of about 5 inches wg. As a result of the arrangement of sectors 78, 84, and 86, the pressure difference between the flue gas sector 78 and the primary oxidant sectors 84 and 86 is insignificant and thus nearly eliminates leakage from the oxidant side to the gas side of preheater 32. The pressure difference between the secondary oxidant sector 82 and the primary oxidant sectors 84 and 86 is about 25 inches wg., but any leakage sector 82 and sectors 84 and 86 would be oxidant from sector 82 to oxidant in sectors 84 and 86 and there would not be a loss of oxygen to the gas side of preheater 32 from the secondary oxidant sector 82.

Referring to FIG. 4, there is shown a simplified representation of a tri-sector regenerative oxidant preheater 32 whose rotation is clockwise. The primary oxidant sector 86 borders the 3 o'clock side of the flue gas sector 78, and is sized to deliver the required primary oxidant temperature. The primary oxidant sector 84 borders 9 o'clock side of the flue gas sector 78, and is sized for the minimum required to substantially preclude the leakage of oxidant into the flue gas sector 78, since there is little heat left as the heat exchanger elements 72 and the rotor 60, both shown in FIG. 3, pass through sector 84 of the preheater 32. The secondary oxidant sector 82 is interposed between the primary oxidant sectors 84 and 86, and is sized to deliver the required secondary oxidant temperature.

Referring to FIG. 5, there is shown a simplified representation of a tri-sector regenerative oxidant preheater 32 whose rotation is counterclockwise. The primary oxidant sector 86 borders the 9 o'clock side of the flue gas sector 78, and is sized to deliver the required primary oxidant temperature. The primary oxidant sector 84 borders the 3 o'clock side of the flue gas sector 78, and is sized for the minimum required to substantially preclude the leakage of oxidant into the flue gas sector 78, since there is little heat left as the heat exchanger elements 72 and the rotor 60, both shown in FIG. 3, pass through sector 84 of the preheater 32. The secondary oxidant sector 82 is interposed between the primary oxidant sectors 84 and 86, and is sized to deliver the required secondary oxidant temperature.

Referring to FIG. 6, there is shown a simplified representation of a tri-sector regenerative oxidant preheater 32 whose rotation can be either clockwise or counterclockwise. The primary oxidant sectors 84/86, bordering the 3 o'clock and 9 o'clock sides of the flue gas sector 78, are of substantially equal size and, when taken together, are sized to deliver the required primary air temperature. The secondary oxidant sector 82 is interposed between the primary oxidant sectors 84/86, and is sized to deliver the required secondary oxidant temperature.

Figure 7:
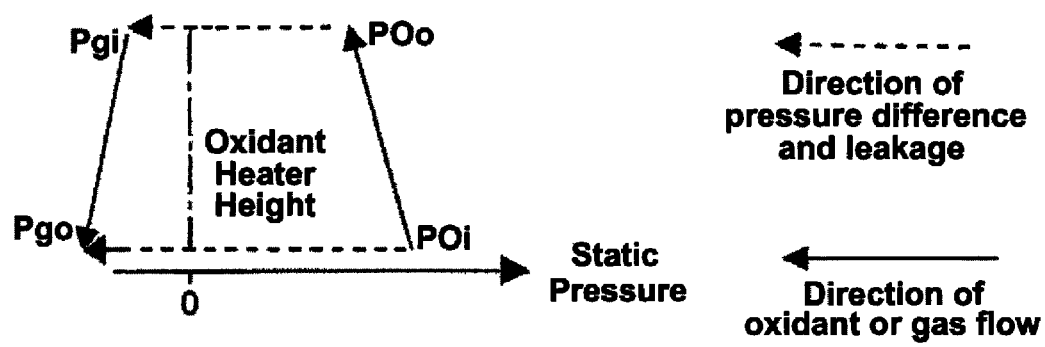
FIG. 7 is a graphical presentation of the pressure profiles through a prior art or conventional regenerative oxidant preheater.

Referring to FIG. 7, there is shown a graphical presentation of the oxidant and flue gas pressure profiles of a prior art or conventional oxidant preheater. The pressure of the oxidant entering the preheater POi is positive and is much higher than the negative pressure flue gas leaving the preheater Pgo. The pressure of the oxidant leaving the preheater POo is positive, and remains much higher than the negative pressure flue gas entering leaving the preheater Pgi. The large pressure difference between the positive pressure oxidant and the negative pressure flue gas, passing through the preheater, causes leakage of oxidant into the gas side of the preheater.

Figure 8:
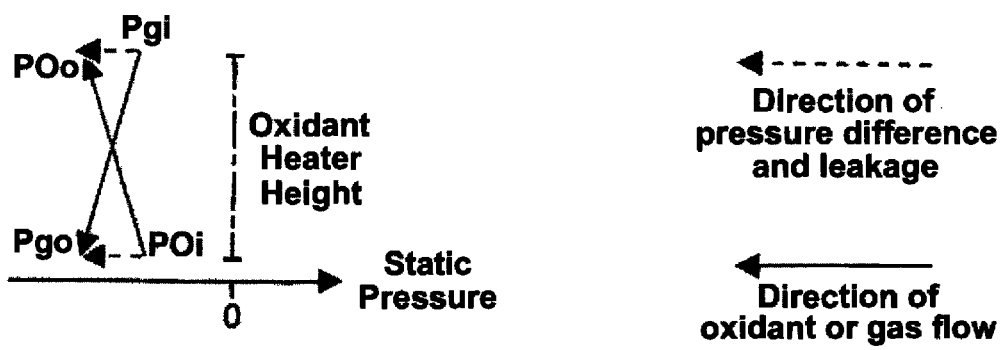
FIG. 8 is a graphical presentation of the pressure profiles through a tri-sector regenerative oxidant preheater in accordance with the present invention.

Referring to FIG. 8, there is shown a graphical presentation of the oxidant and flue pressure profiles of the present invention. The pressure of the oxidant entering the preheater POi is somewhat less negative than the negative pressure flue gas leaving the preheater Pgo. The pressure of the oxidant leaving the preheater POo is somewhat more negative than the negative pressure flue gas entering the preheater Pgi. The somewhat lesser negative pressure of the oxidant entering the preheater POi results in a slight leakage of oxidant into the gas side of the preheater. The somewhat lesser negative pressure of the flue gas entering the preheater Pgi results in a slight leakage of flue gas into the oxidant side of the preheater.

Although the present invention has been described above with reference to particular means, materials, and embodiments, it is to be understood that this invention may be varied in many ways without departing from the spirit and scope thereof, and therefore is not limited to these disclosed particulars but extends instead to all equivalents within the scope of the following claims.

We claim:

1. A method for preheating primary and secondary oxidant in a tri-sector rotary regenerative oxidant preheater including a stationary housing, a rotor rotatably mounted in the housing, sector plates located at the axial ends of the rotor dividing the preheater into a flue gas sector, a secondary oxidant sector, and two primary oxidant sectors, the secondary oxidant sector being interposed between the primary oxidant sectors, the method comprising providing:

a tri-sector rotary regenerative oxidant preheater including a stationary housing, a rotor rotatably mounted in the housing, sector plates located at the axial ends of the rotor dividing the preheater into a flue gas sector, a secondary oxidant sector, and two primary oxidant sectors, the secondary oxidant sector being interposed between the primary oxidant sectors;

passing primary oxidant to be heated through the primary oxidant sectors;

passing secondary oxidant to be heated through the secondary oxidant sector;

passing hot flue gas through the flue gas sector to heat the primary and secondary oxidants; and maintaining the environment in both primary oxidant sectors at about the same negative pressure as that of the flue gas sector; and maintaining the environment in the secondary oxidant sector at a positive pressure.

2. A method according to claim 1, including the step of maintaining the environment in both primary oxidant sectors at a negative pressure of about 5 inches wg.

3. A method according to claim 1, including the step of maintaining the environment in wherein the secondary oxidant sector is maintained at a positive pressure of about 20 inches wg.

4. A method according to claim 1, including the step of rotating the rotor in a clockwise direction.

5. A method according to claim 4, including the step of sizing the primary oxidant sector bordering the leading edge of the rotor side 3 o'clock side of the flue gas sector to deliver a required primary oxidant temperature.

6. A method according to claim 1, including the step of rotating the rotor in a counterclockwise direction.

7. A method according to claim 6, including the step of sizing the primary oxidant sector bordering the leading edge of the rotor side 9 o'clock side of the flue gas sector to deliver a required primary oxidant temperature.

8. A method according to claim 1, including the step of sizing the primary oxidant sectors to be of substantially equal size.

9. A method according to claim 1, including the step of sizing the primary oxidant sectors so as together to deliver a required primary oxidant temperature.

10. A method according to claim 1, including the step of sizing the secondary oxidant sector to deliver a required secondary oxidant temperature.

* * * * *